Jan. 17, 1956  C. G. SONTHEIMER  2,731,621
COUNTERFEIT DETECTOR
Filed April 1, 1952  2 Sheets-Sheet 1
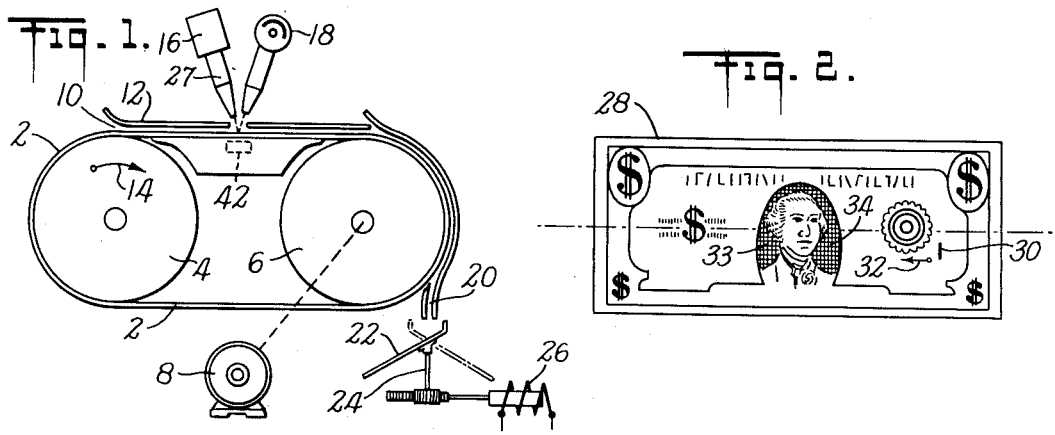
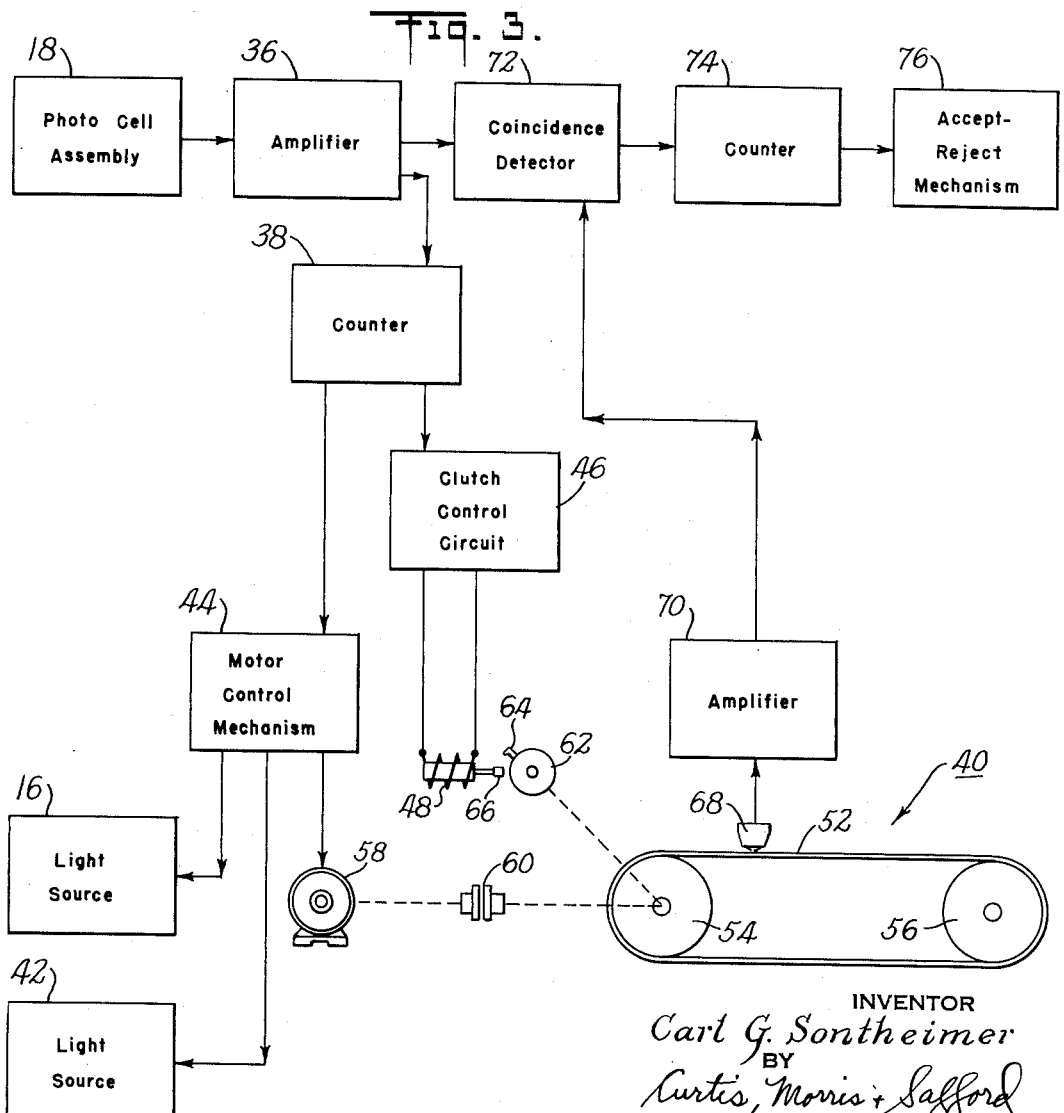
INVENTOR
Carl G. Sontheimer
BY
Curtis, Morris + Safford
ATTORNEYS Jan. 17, 1956  C. G. SONTHEIMER  2,731,621
COUNTERFEIT DETECTOR
Filed April 1, 1952  2 Sheets-Sheet 2
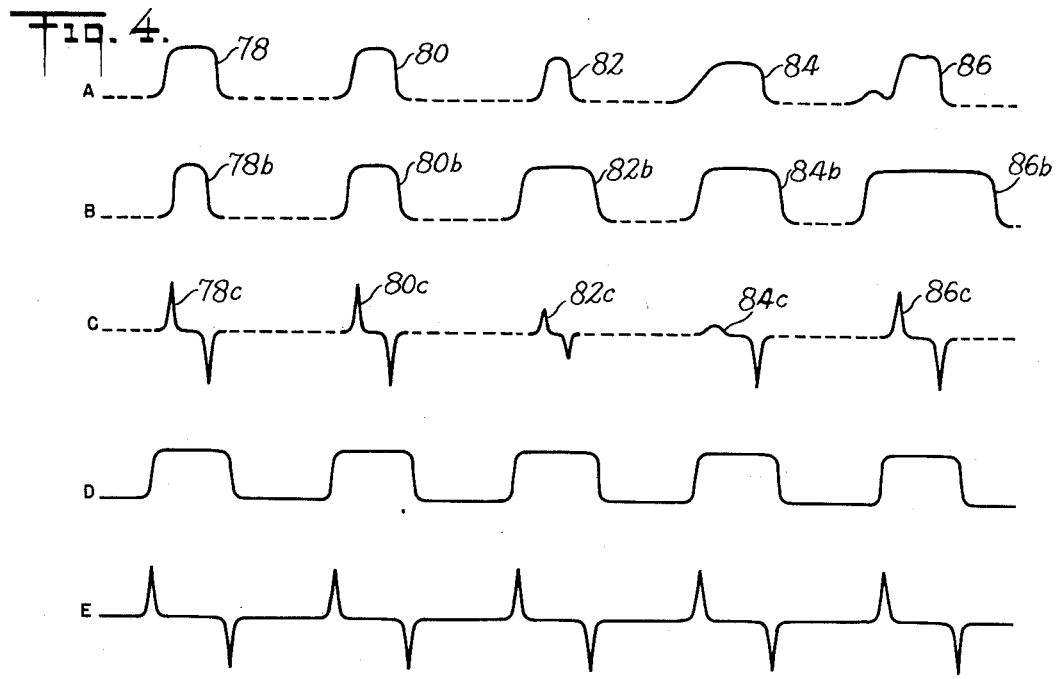
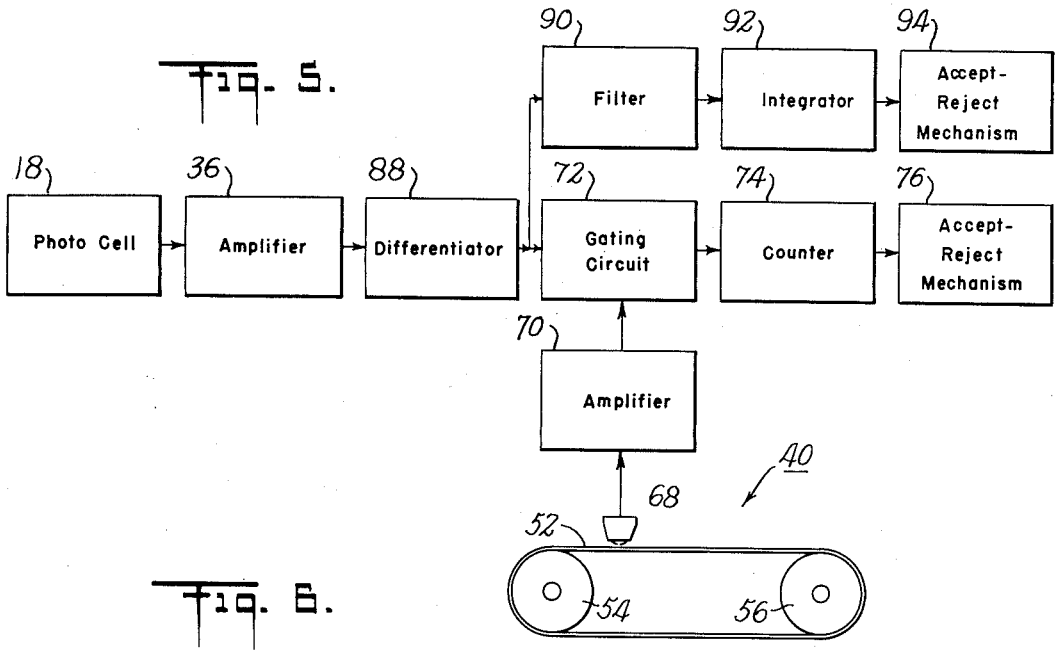
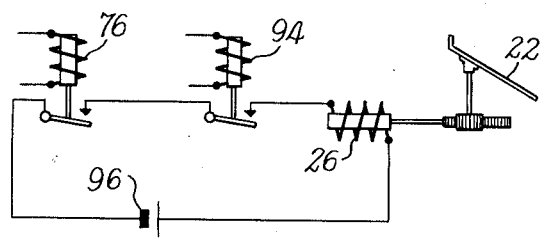
INVENTOR
*Carl G. Sontheimer*
BY
*Curtis, Morris & Safford*
ATTORNEYS

United States Patent Office 2,731,621
Patented Jan. 17, 1956

2,731,621

COUNTERFEIT DETECTOR

Carl G. Sontheimer, Riverside, Conn., assignor to C. G. S. Laboratories, Inc., Stamford, Conn., a corporation of Connecticut Application April 1, 1952, Serial No. 279,739

9 Claims. (Cl. 340—149)

This invention relates to the identification of documents and to the detection of counterfeit bills. More particularly, it relates to apparatus for checking electrical characteristics of signals derived from the engraving on paper currency.

Various methods have been proposed for testing whether paper money is genuine, but none of the methods thus far proposed has been as reliable as visual examination. The quality of the engraving on a counterfeit bill is ordinarily inferior to that on a genuine bill, but prior systems have not provided any satisfactory arrangement for checking this characteristic.

The present invention provides a method and apparatus for testing both the quality and the accuracy of the engraving. For most uses, the need for precision positioning of the bill being tested is eliminated so that simple and inexpensive mechanical apparatus can be used for handling the bills.

The apparatus described herein provides for over-all dimensional checks and for independent checks on the accuracy and quality of the engraving, and can be used in conjunction with other testing methods already known. For example, apparatus for checking the color, electrical conductivity, thickness, absorption of particular frequencies of radiant energy, and the like can be used. The number of independent checks to be used will depend upon the degree of perfection required for the particular application, but no other single check now known provides the degree of infallibility of the present method.

The advantages and objects of this invention will be in part pointed out in and in part apparent from the following description considered in connection with the accompanying drawings, in which:

Figure 1 represents diagrammatically an apparatus for scanning the surface of a bill that is being tested;

Figure 2 represents diagrammatically certain features of the engraving on a United States bill;

Figure 3 is a diagrammatic representation showing the method of and apparatus for checking certain characteristics of the engraving;

Figure 4 is a graph for assistance in explaining the principles of the invention;

Figure 5 is a diagrammatic representation for explaining the method of and apparatus for checking other characteristics of the engraving; and Figure 6 shows schematically how the apparatus of Figures 3 and 5 can be connected to the apparatus of Figure 1.

Figure 1 illustrates diagrammatically an apparatus for handling the paper currency or other documents which are to be identified. An endless belt 2 formed of canvas, rubber, or other suitable material, extends around two rollers 4 and 6. The roller 6 is arranged to be driven by means of a motor 8 through any desired mechanism. The motor 8 may be arranged to operate continuously, or it may be controlled manually by the person using the machine. Alternatively, the motor 8 may be controlled so that when a bill is placed in the machine, the motor 8 is automatically started. Such arrangements are already known, and accordingly are not described here.

In operation, a bill is placed in a slot 10 formed between the belt 2 and an upper plate 12, which may be formed of glass or plastic, at least a portion of which is transparent for the purpose to be described subsequently. The bill to be checked is carried by the belt 2 in the direction indicated by the arrow 14 and is scanned by means of a light source 16 and a photocell 18, after which it is carried around the roller 8 and exits through a chute 20.

The bill then drops upon the sloping platform 22, which is arranged to be rotated by a vertical shaft 24, so that the platform 22 can assume either of two positions, for example separated by 180 degrees. The position of the platform 22 can be controlled by a solenoid 26. The apparatus may be arranged so that the platform 22 is in the position indicated in the drawing, when the solenoid 26 is de-energized, and so that it will assume the position shown in broken lines when the solenoid 26 is energized. Thus, the solenoid 26 may be arranged to remain in its de-energized position unless the bill tested by the machine has been found to be genuine, in which event the solenoid 26 is energized and the platform 22 is rotated to the position shown in dotted outline, thus permitting a bill to slide from the platform 22 into a compartment designated for the genuine bills.

In order to scan the engraving on the bill, the light source 16 is directed to the same spot on the bill as is the photocell 18. In order to obtain the necessary scanning detail, the light source 16 is passed through a lens system, diagrammatically indicated at 27, which focuses the light beam into a narrow rectangular area on the surface of the bill. This area may have a length, for example, of approximately $\frac{1}{16}''$ and a width preferably as narrow as it is possible to make it and still obtain sufficient illumination for the photocell 18. The photocell 18, preferably is a type having high sensitivity and advantageously may be a photocell of the type incorporating an electron multiplier so that a very narrow scanning line can be utilized.

Instead of providing a lens system 27 on the light source 16, the light source 16 may be allowed to cover a substantially larger area, and the lens system placed between the surface of the bill and the photocell 18, so that only the light from the desired scanning area is passed into the photocell 18.

Figure 2 illustrates diagrammatically a bill 28 that is to be passed through the identification apparatus. As the bill 28 moves through the machine, the scanning area, indicated diagrammatically at 30 with its dimensions exaggerated in relation to the dimensions of the bill moves in the direction of the arrow 32 across the face of the bill from end to end. The scanning area may be selected to move either lengthwise or crosswise of the bill, but it is preferred to scan the bill from end to end with the scanning line passing just below the center line of the bill.

Although the single scanning line 30, passing once across the face of the bill, will provide a good check on the genuineness of the bill, it is apparent that several portions of the bill may be scanned either simultaneously or in succession to provide an even more reliable system.

It is preferred to scan the side of the bill bearing the portrait in order that the two orthoganol sets of parallel lines immediately adjacent the portrait may be utilized in a manner to be described later.

Figure 3 illustrates by means of block diagrams a method for checking the over-all dimensions of the bill. The signal from the photocell 18 is passed into an amplifier 36, the output signal from which is connected to a counter 38. This counter may be an electronic counter, or it may be a mechanical device such as an ordinary stepping relay. A two-step repeating relay is suitable for this purpose. The purpose of this counter 38 is to control the starting mechanism of a magnetic reproducing device, diagrammatically indicated at 40.

As the bill which is to be scanned passes through the apparatus shown in Figure 1, the leading edge of the bill passes between a light source 42 and the photocell 18. This light source 42 is sufficient to energize the photocell 18 when there is no bill in the machine, but is so weak that when the leading edge of the bill intercepts the light from the source 42 it has no further effect on the operation of the photocell 18.

This interruption in the light from the photocell 18 causes the counter or stepping relay 38 to move to its first position. In this position, the counter 38 is arranged to apply a signal to a light-control relay and motor control mechanism 44, which has its own holding circuit and is arranged when energized to extinguish the light 42 and to energize the light 16. When the light 16 is energized, the photocell 18 is responsive to the variations in the intensity of the light reflected from the scanning area 30, which now moves across the face of the bill. When the scanning area 30 reaches the first engraved mark on the bill, usually the line which forms the outer portion of the border, the counter 38 is moved to its second position, and in this position energizes a clutch control circuit 46 which energizes a solenoid 48 and permits the magnetic reproducing apparatus to operate. The magnetic reproducing apparatus includes a magnetic tape 52 which may be a metal tape with or without an additional magnetic coating, or it may be formed with a paper or plastic base provided suitable precautions are taken against changes in the dimensions of the tape.

The endless magnetic tape or belt 52 passes over two rollers 54 and 56. The roller 54 is driven by means of an electric motor 58, which is coupled through a clutch mechanism diagrammatically indicated at 60. This clutch is arranged so that it will provide sufficient torque to drive the tape 52 at full speed, but is arranged so that if the movement of the roller 54 is blocked, the clutch 60 will merely slip until the roller 54 is released. The roller 54 is mechanically coupled to a wheel 62, this coupling link being direct or through any desired gear ratio. A latch 64 on the wheel 62 is positioned to engage an armature structure 66 of the solenoid 48. Thus, when the solenoid 48 is de-energized, the latch 64 strikes the armature structure 66 and prevents the movement of the magnetic tape 52, the clutch 60 merely slipping during this time. However, when the solenoid 48 is energized as the first mark on the bill comes within the scanning area, the solenoid 48 is energized, and the wheel 62 is released allowing the magnetic belt 52 to start moving. As the magnetic belt 52 moves, the signals previously recorded on this belt are picked up by means of a head 68 and fed into an amplifier 70, from which they are applied to a coincidence or gating circuit 72. The signals from the amplifier 36 also are fed into the coincidence circuit 72.

The coincidence circuit 72 is arranged to produce an output signal only when a signal from the amplifier 36, of predetermined polarity, is applied to the coincidence detector 72 during a time that it is receiving a signal from the amplifier 70.

In order to have a standard with which to compare the engraving on the bills to be passed through the machine, signals are recorded on the tape 52 which correspond to certain predetermined lines on the engraving of the bill. Thus, certain straight lines which extend substantially across the bill provide useful check points and signals corresponding to these lines are recorded on the magnetic belt 52.

It is apparent that if the movement of the belt 2 which carries the bill 28 is carefully regulated with respect to the speed of the motor 58 which drives the magnetic tape 52, the scanning area 30 can be made to cross these various marks on the bill simultaneously with the reproduction of a corresponding signal by the head 68. Synchronization is simplified if the same motor is used to drive both the belt 2 and the magnetic tape 52. In a practical machine, the checking of five or six engraved lines has been found adequate to provide an over-all check on the dimensional accuracy of the bill.

The signals from the coincidence detector 72 are applied to a counter 74 which again may be an electronic counter, a stepping relay, or other suitable mechanism. The counter 74 is arranged so that when a predetermined number of impulses have been received from the coincidence detector 72, it will deliver a control signal to an accept-reject relay 76, which may be provided with its own holding circuit.

Thus, suppose that ten engraved lines on the bill have been selected as check points. The counter 74 could be arranged so that when it has received ten impulses, it will actuate the accept-reject relay 76. However, it is usually not desirable to reject all imperfect bills, and accordingly a certain amount of tolerance should be permitted in the testing of the bills. Thus, if ten marks have been decided upon as check points in the bill, the counter 74 may be arranged so that it will actuate the relay 76 to the accept position if eight or more impulses are received.

Moreover, genuine bills are not dimensionally stable. Thus, the paper from which the bills are made will shrink or will change dimensions with changes in humidity. Accordingly, some tolerance must be provided for in the operation of the coincidence detector if good bills are not to be rejected.

Figure 4 shows a comparison between the signals provided by the bill passing through the machine and the signals which are recorded on the magnetic tape 52. Curve A shows the signals produced by five engraved lines on the bill which are used as check points. The first signal, indicated at 78, is produced by a relatively sharp engraved line in which the intensity or blackness of the line may be taken as standard. The next signal 80 is produced by a line slightly narrower than the line which produced the signal 78, but which is of the same intensity. The next signal 82 is produced by a line in which the ink is of substantially less intensity. The next signal 84 is produced by a line having the same width as the line that produced the signal 78. The intensity of the ink forming this line is somewhat less than that taken as standard, that is, this line is not quite as dark in color as the normal engraved line on a genuine bill. The leading edge of this line on the bill is not sharp. The last check signal 86 is produced by a line having about the same average intensity as the line 84. There is a very slight imperfection in the engraved line.

The broken lines between the adjacent signals indicate that there are many other lines which are scanned between the ones shown in the drawing, and which produce signals. These signals, however, are ignored, so far as the present circuits are concerned, because no corresponding signals have been recorded on the magnetic tape 52, and accordingly the coincidence detector 72 does not respond to these signals.

Curve B of Figure 4 shows the corresponding signals produced from the magnetic tape 52. The gating signals corresponding to the signals produced on the photocell as shown in curve A, are given corresponding numbers followed by the suffix "b." It will be noted that the first two check marks coincide in time with the signals from the magnetic tape 52 so that the counter 74 is actuated once for each of these signals. The signal 82 corresponds in time with the signal 82b from the magnetic tape, but it will be noted that the signal 82 is of substantially lower amplitude than the other signals because of the lesser intensity of this line. Accordingly, the magnitude of this signal 82 is insufficient to operate the coincidence detector 72 and the counter 74 does not indicate the presence of this line.

The signal 84 occurs during the same time as the signal 84b from the magnetic tape, but it is slightly less than standard in amplitude. However, the difference between the accepted standard of intensity and the intensity of the line that produced the signal 84 is so slight that the coincidence detector 72 operates and ignores this slight difference in intensity, thereby actuating the counter 74 to its next position. The signal 86 also occurs within the time interval of the signal 86b from the magnetic reproducer, and accordingly actuates the counter 74.

It will be noted that near the portion of the bill that is scanned first, the time duration of the signals, such as 78b and 80b, from the magnetic reproducer, are substantially equal to the duration of the signals produced by the corresponding lines on the bill. However, as the scanning area progresses across the bill, the signals from the magnetic tape are of gradually increasing duration, so that normal dimensional changes in the bills will not interfere with the operation of the counter 74. Thus, it will be noted that the center of the signal 86 does not correspond in time with the center of the signal 86b. However, because the signal 86b has been made with a greater time duration than the signal 86, the two voltages are present simultaneously on the coincidence detector 72, and accordingly operate this detector to actuate the counter 74. Thus, in this example, five check lines have been used, and four of these have actuated the counter 74. Ordinarily this would be considered a sufficient check, and the counter 74 would be arranged to actuate the accept-reject relay to its "accept" position.

The arrangement described above has provided certain information in connection with the dimensions of the bill and the position of certain lines, but has not provided any reliable information in connection with the sharpness of the engraving by which the lines are formed. This information can be obtained by differentiating the signals from the photocell circuits.

Figure 5 shows a modification of the circuit arrangement of Figure 3 in which a differentiator 88 has been positioned between the amplifier 36 and the gating circuit 72. When the signals shown in line A of Figure 4 are differentiated, the signals shown in curve C are produced. Either the positive or negative signals may be utilized to actuate the coincidence detector. Let us assume that the positive signals on curve C are utilized to actuate the coincidence detector 72. It will be clear that the coincidence detector will respond to the signals 78C and 80C, each of which will actuate the counter 74. However, as before, the signal 82C produced by differentiation of the signal 82 will not have sufficient magnitude to actuate the coincidence detector. The signal 84 has a gradually sloping rise on the leading edge, indicating that this portion of the engraving is fuzzy or ragged. Accordingly, when this signal is differentiated to produce signal 84C, the positive pulse which is produced by the leading edge of the line is of low amplitude and does not actuate the coincidence detector 72. The signal 86C actuates the coincidence detector as before. Accordingly, the present system has detected an imperfect line in the engraving which was not detected by the arrangement described first. It will be apparent that the trailing edges of the lines may be checked by utilizing the signals of opposite polarity of the curve C in Figure 4.

The areas of engraving indicated at 33 and 34 in Figure 2, which are within the circle surrounding the portrait of a United States bill, provide a particularly desirable check on the accuracy and skill with which the engraving has been prepared. For this purpose, utilization is made of the closely spaced parallel lines across which the scanning area 30 passes. In order to check this portion of the bill, a band-pass filter 90 (Figure 5) is coupled to the output of the differentiator 88 and is arranged to pass a narrow band of frequencies corresponding to the rate at which the engraving lines in the areas 33 and 34 are scanned by the area 30. Ordinarily, the bill will be moved at such a speed that this frequency is between 30 and 400 cycles. For example, with a given speed of bill movement, the filter 90 may be arranged to pass frequencies between 110 and 118 cycles. The signals delivered by the photocell as the scanning area 30 passes the area 33 or 34, is indicated by curve D of Figure 4. Curve E of this figure shows the signals resulting from differentiation of these signals. Thus, if the repetition rate or frequency of the signals shown in the curve E is not within the pass-band of the filter 90, these signals will be rejected. That is, if the spacing of the lines and the width of the lines in this cross-hatched area do not correspond to that of a genuine bill, these signals will not be passed by the filter 90. Without exactly determining the scanning position, it will be necessary for the scanning area 30 to pass a certain minimum number of lines as it scans between the edge of the circle and the portrait within the circle. Accordingly, an integration circuit is provided which responds only when the filter circuit 90 has passed signals for a length of time corresponding to this minimum number of lines. This integrator 92 may be formed by means of a rectifier with a resistance-capacitance time delay circuit coupled thereto, or it may be formed by means of an electronic counter which counts the total number of pulses passed by the filter 90. When this integrator circuit has reached a predetermined value, it actuates another accept-reject relay 94 to indicate that the bill is to be accepted.

Figure 6 shows an arrangement by which the accept-reject relays 76 and 94 may be connected to actuate the solenoid 26. When the relays 76 and 94 are both closed, a circuit is completed from the battery 96 through the energizing winding of the solenoid 26, and the contacts of the relays 76 and 94. The solenoid 26 is thus energized and moves the platform 22 to the position by which the bill is permitted to slide into the correct compartment. Holding circuits can be provided for the relays 76 and 94.

At the end of the cycle when the bill has been deposited in the received compartment, or has been rejected, it is necessary to re-set all of the circuits so that the proper starting point will be assumed. This can be accomplished by any suitable means. For example, a photocell and light source may be arranged immediately beneath the chute 20 so that as the bill is deposited upon the platform 22, the light beam is interrupted and the re-set circuits are actuated. Another suitable arrangement is to provide a switch mechanism that is actuated by the rotation of the roller 4 or 6, which stops the machine and re-sets all of the circuits after these rollers have moved far enough to carry the bill completely through the machine.

I claim:

1. Apparatus for verifying the genuineness of a printed document comprising means for holding and moving at constant speed along a predetermined path a document to be verified, optical scanning means arranged to produce electrical signals in accordance with the variations in reflectivity of different scanned portions of said document, a record having a predetermined series of verification signals recorded thereon, a reproducer associated with said record, means driving said record in synchronized relationship with the movement of said document to produce a second time-sequence of signals, a coincidence detector coupled to said reproducer and to said scanning means and responsive to the reception of simultaneous signals therefrom, a counter circuit under the control of said coincidence detector, and an accept-reject mechanism under the control of said counter circuit.

2. Apparatus for verifying the genuineness of a printed document comprising means for holding and moving at a constant speed along a predetermined path a document to be verified, optical scanning means arranged to produce a first succession of electrical signals in accordance with the variations in reflectivity of different scanned portions of said document, a frequency-selective circuit coupled to said scanning means and responsive to the reception of signals of predetermined frequency therefrom, an accept-reject mechanism under the control of said frequency selective circuit, a record containing a predetermined series of check signals, driving means for said record, a reproducer associated with said record to produce therefrom a second succession of signals, and a coincidence detector also coupled to said scanning means and responsive to coincidence of signals of said first and second successions, said accept-reject mechanism being also under the control of said coincidence detector.

3. Apparatus for verifying the genuineness of a printed document comprising means for holding and moving at constant speed along a predetermined path a document to be verified, optical scanning means arranged to produce a first time-sequence of electrical signals in accordance with the variations in reflectivity of different scanned portions of said document, a differentiating circuit coupled to said scanning means, a record having a predetermined series of verification signals recorded thereon, a reproducer associated with said record, means driving said record in synchronized relationship with the movement of said document to produce a second time-sequence of signals, a coincidence detector coupled to the output of said reproducer and to the output of said differentiating circuit and responsive to the reception of simultaneous signals therefrom, a counter circuit under the control of said coincidence detector, and an accept-reject mechanism under the control of said counter circuit.

4. Apparatus for verifying the genuineness of a printed document having spaced markings thereon by determining the accuracy of predetermined edges of said markings comprising means for holding and moving at constant speed along a predetermined path the document to be verified, optical scanning means arranged to produce electrical signals in accordance with the variations in reflectivity of different scanned portions of said document, a differentiating circuit coupled to the output of said scanning means, a frequency-selective circuit coupled to the output of said differentiating circuit, a counter circuit under the control of said frequency-selective circuit, and an accept-reject mechanism under the control of said counter circuit.

5. Apparatus for verifying the genuineness of a printed document comprising means for holding and moving at constant speed along a predetermined path a document to be verified, optical scanning means arranged to produce electrical signals in accordance with the variations in reflectivity of different scanned portions of said document, a differentiating circuit coupled to said scanning means, a record having predetermined verification signals recorded thereon, a reproducer associated with said record, means driving said record in synchronized relationship with the movement of said document, a coincidence detector coupled to said reproducer and to said scanning means and responsive to the reception of simultaneous signals therefrom, a frequency-selective circuit coupled to receive signals from said differentiating circuit, and an accept-reject mechanism under the mutual control of said differentiating circuit and said coincidence detector.

6. Apparatus for verifying the genuineness of a printed document having spaced lines thereon comprising means for holding and moving at predetermined speed along a predetermined path the document to be verified, optical scanning means arranged to produce electrical signals in accordance with the variations in reflectivity of different scanned portions of the lines on said document, a differentiating circuit coupled to the output of said scanning means, a comparison circuit coupled to the output of said differentiating circuit, a source of standard reference signals coupled to said comparison circuit, a counter circuit under the control of said comparison circuit, and an accept-reject mechanism under the control of said counter circuit.

7. Apparatus for verifying the genuineness of a printed document having a plurality of spaced lines thereon by determining the accuracy of predetermined edges of said lines comprising means for holding and moving at constant speed along a predetermined path the document to be verified, optical scanning means arranged to produce electrical signals in accordance with the variations in reflectivity of different scanned portions of the spaced lines on said document, a differentiating circuit coupled to the output of said scanning means, a band pass frequency filter circuit coupled to the output of said differentiating circuit, a counter circuit under the control of said filter circuit, and an accept-reject mechanism under the control of said counter circuit.

8. Apparatus for verifying the genuineness of a printed document having a substantial number of closely spaced marks by verifying the accuracy of positioning of predetermined boundaries of said marks comprising means for holding and moving at predetermined speed along a predetermined path a document to be verified, optical scanning means arranged to produce a time-sequence of electrical signals in accordance with the variations in reflectivity of different scanned portions of said closely spaced marks on said document, a differentiator circuit coupled to the output of said scanning means for differentiating said signals, a gating circuit coupled to said differentiator circuit, control means responsive to operation of said holding and moving means coupled to said gating circuit for controlling said gating circuit to condition said gating circuit for passage of the signals from said differentiating circuit, a counter circuit coupled to said gating circuit and actuated by passage of said signals, and an accept-reject mechanism under the control of said counter circuit.

9. Apparatus for verifying the genuineness of a printed document having a substantial number of closely spaced marks by determining the accuracy of positioning of said marks on the document comprising means for holding and moving at predetermined speed along a predetermined path the document to be verified, optical scanning means arranged to produce a time-sequence of electrical signals in accordance with the variations in reflectivity of different scanned portions of said closely spaced marks on said document, a gating circuit coupled to said scanning means, control means responsive to operation of said holding and moving means coupled to said gating circuit for controlling said gating circuit to condition said gating circuit for passage of the signals from said scanning means, a counter circuit coupled to said gating circuit and actuated thereby, and an accept-reject mechanism under the control of said counter circuit.

References Cited in the file of this patent

UNITED STATES PATENTS

| | | |
|---|---|---|
| 1,983,388 | Moore | Dec. 4, 1934 |
| 2,026,330 | Tauschek | Dec. 31, 1935 |
| 2,224,646 | Friedman et al. | Dec. 10, 1940 |
| 2,531,236 | Snell et al. | Nov. 21, 1950 |
| 2,580,270 | Badgley et al. | Dec. 25, 1951 |
| 2,594,358 | Shaw | Apr. 29, 1952 |
| 2,612,994 | Woodland et al. | Oct. 7, 1952 |